United States Patent [19]
Friesen et al.

[11] Patent Number: 5,253,746
[45] Date of Patent: Oct. 19, 1993

[54] AUGER ASSEMBLY FOR A BULK SEED TRANSPORT BIN

[76] Inventors: Garry D. Friesen, 704 Clover La.; Raymond P. Waldner, 816 Kalvin Dr., both of Storm Lake, Iowa 50588

[21] Appl. No.: 992,421

[22] Filed: Dec. 17, 1992

[51] Int. Cl.⁵ .................................................. B65G 65/34
[52] U.S. Cl. .............................. 198/550.2; 198/550.1; 198/674; 198/677
[58] Field of Search ............... 198/550.1, 550.2, 550.4, 198/677, 674, 675

[56] References Cited

U.S. PATENT DOCUMENTS

| | | | |
|---|---|---|---|
| 1,829,453 | 10/1931 | Parker | 198/677 |
| 3,194,385 | 7/1965 | Barnese | 198/550.1 |
| 3,197,075 | 7/1965 | Hansen | 198/550.1 X |
| 4,016,970 | 4/1977 | Wert | 198/550.1 X |
| 4,095,705 | 6/1978 | Hood | 198/674 X |
| 4,429,782 | 2/1984 | Pierson | 198/677 |
| 4,989,716 | 2/1991 | Stuckey | 198/550.1 X |
| 5,004,095 | 4/1991 | Lapeyre et al. | 198/677 X |
| 5,183,147 | 2/1993 | Callahan et al. | 198/674 X |

FOREIGN PATENT DOCUMENTS 1264151  1/1990  Canada ............... 198/550.1
8909739 10/1989  PCT Int'l Appl. ...... 198/550.1

Primary Examiner—D. Glenn Dayoan
Attorney, Agent, or Firm—Zarley, McKee, Thomte, Voorhees, & Sease

[57] ABSTRACT

A bulk seed transport bin includes an enclosed storage container mounted on a frame. An auger extends upwardly out of a roof portion of the container and has an upper dispensing port. The auger includes a lower end extending through the interior of the container and downwardly through a funnel-shaped lower portion of the container. An auger shaft with flighting thereon is removably mounted within the auger tube, and may be removed through the upper end of the auger tube by removing an upper flange sealing the upper end of the tube. The lower end of the auger shaft is hollow and is journaled on the upper end of a connector shaft extending through the lower end of the auger tube. The upper end of the connector shaft has an arm mounted thereon which will engage a stop on the lower end of the auger shaft when the auger shaft is journaled on the connector shaft. A pulley mounted on the lower end of the connector shaft is driven by a motor so as to drive the auger shaft and flighting to dispense product from the storage container.

6 Claims, 3 Drawing Sheets

AUGER ASSEMBLY FOR A BULK SEED TRANSPORT BIN

TECHNICAL FIELD

The present invention relates generally to transport bins for bulk seed and other dry flowable products, and more particularly to an improved auger assembly for a transport bin which is readily transportable for simple and convenient transport of seed and the like to the field.

BACKGROUND OF THE INVENTION

It is often necessary to refill a planter implement when sowing a field rather than taking the implement out of the field and back to the farm yard. It is more typical to transport extra seed to the field site. Prior to the use of bulk handling equipment, it was often necessary to refill a seed planter utilizing 50 pound bags of seed. Because current seed planters will hold large quantities of seed, refilling the planter could take a lengthy amount of time.

Seed is currently available in large bulk bags, in sizes of 1,000–3,000 pounds. Delivery and handling time of such a bulk bag is minimal when compared to the prior art 50 pound bags. However, distribution of the seed from such a large bag can be difficult and complicated.

It is therefore a general object of the present invention to provide a bulk seed transport bin which may be easily transported to a field to distribute seeds and the like to an implement.

A further object of the present invention is to provide a bulk seed transport bin with a distribution auger having easily removable flighting.

Another object of the present invention is to provide a bulk transport bin with an operable lid which cannot be blown shut by the wind.

Still another object is to provide a bulk seed transport bin with a telescopic spout and seed flow control mechanism operably mounted on the spout.

These and other objects will be apparent to those skilled in the art.

SUMMARY OF THE INVENTION

The bulk seed transport bin of the present invention includes an enclosed storage container mounted on a frame dimensioned to be received within a pick-up cargo box or the like. The storage container includes an auger which extends upwardly out of a roof portion of the container with an upper dispensing port on the upper end thereof. The auger includes a lower end extending through the interior of the container and downwardly through a funnel-shaped lower portion of the container. An auger shaft with flighting thereon is removably mounted within the auger tube, and may be removed through the upper end of the auger tube by removing an upper flange sealing the upper end of the tube. The lower end of the auger shaft is hollow and is journaled on the upper end of a connector shaft extending through the lower end of the auger tube. The upper end of the connector shaft has an arm mounted thereon which will engage a stop on the lower end of the auger shaft when the auger shaft is journaled on the connector shaft. A pulley mounted on the lower end of the connector shaft is driven by a motor so as to drive the auger shaft and flighting to dispense product from the storage container.

A telescoping dispensing spout has a flexible elbow connected at its upper end which connects the spout to the dispensing port of the auger tube, to permit convenient pivotal movement of the dispensing spout to a desired location. A control cable extending from the motor driving the auger is operably connected to a pivotal lever mounted on the dispensing end of the dispensing spout, to permit selective control of the rate at which seeds or other products are dispensed from the storage bin.

A lid is operably mounted on the roof portion of the storage container, and is mounted on a pair of tracks to move within a generally horizontal plane between an open and closed position. A viewing glass mounted in the side wall of the container permits convenient viewing of the interior of the container. A pair of fork lift brackets mounted on the lower frame allows a fork lift to position the transport bin in the desired location.

DESCRIPTION OF THE PREFERRED EMBODIMENT

Figure 1:
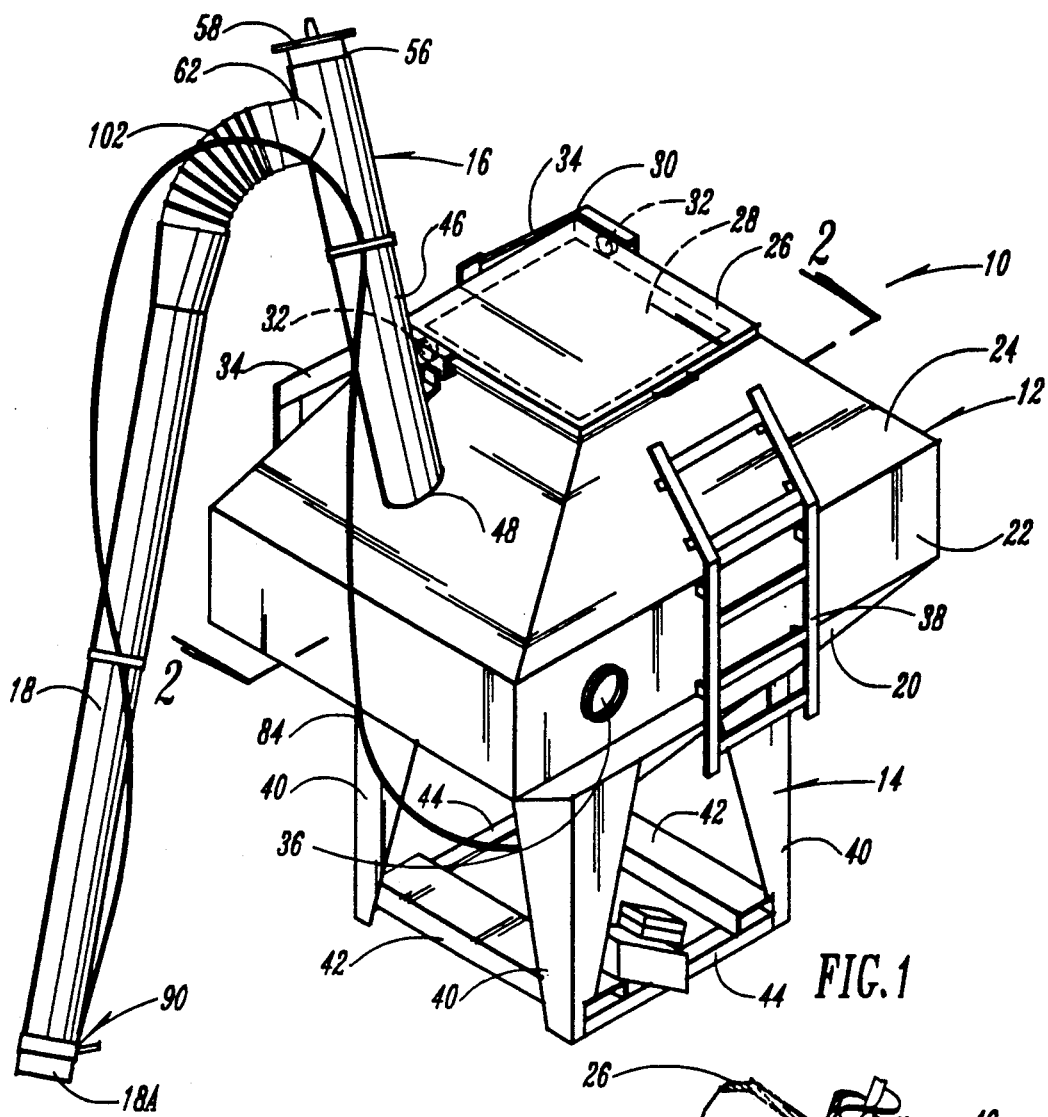
FIG. 1 is a perspective view of the bulk seed transport bin of the present invention.

Referring now to the drawings, in which similar or corresponding parts are identified with the same reference numeral and more particularly to FIG. 1 the bulk seed transport bin of the present invention is designated generally at 10 and includes a storage container 12 supported on a frame 14 having dimensions to fit within a conventional pickup box. An auger 16 extends upwardly and outwardly from container 12 and has a telescoping dispensing spout 18 attached thereto.

Storage bin 12 includes a generally pyramidal shaped lower funnel portion 20 with an upstanding side wall 22 mounted along the upper end thereof. A pyramidal shaped roof portion 24 matches the funnel portion, and is truncated to form a square top wall 26 having an access opening 28 therein. Preferably, top wall 26 and access opening 28 are of dimensions which correspond with conventional bulk bag handling equipment.

A lid 30 has plastic rollers 32 mounted along opposing sides, which are journaled within a pair of tracks 34 so that the lid will slide along tracks 34 to reveal access opening 28. This gives lid 30 a low profile when in the open position, such that wind or other forces will not blow the lid shut. The configuration of the lid also gives the transport bin 10 a lower overall profile whether the lid 30 is open or closed.

A viewing glass 36 is mounted in side wall 22, to permit the consumer to easily monitor the level of seed or other product within container 12. A ladder 38 mounted on side wall 22 and roof portion 24 permits easy access to lid 30 and access opening 28.

Frame 14 supports storage container 12, and includes four legs 40 extending downwardly from funnel portion 20 of container 12. Preferably, a pair of tubular fork lift brackets 42 are mounted parallel to one another and spaced apart at the lower ends of legs 40. In this way, fork lift brackets 42 act as structural cross members between legs 40. A second set of cross members 44 are mounted between the forward and rearward ends of fork lift brackets 42, for structural integrity.

Figure 2:
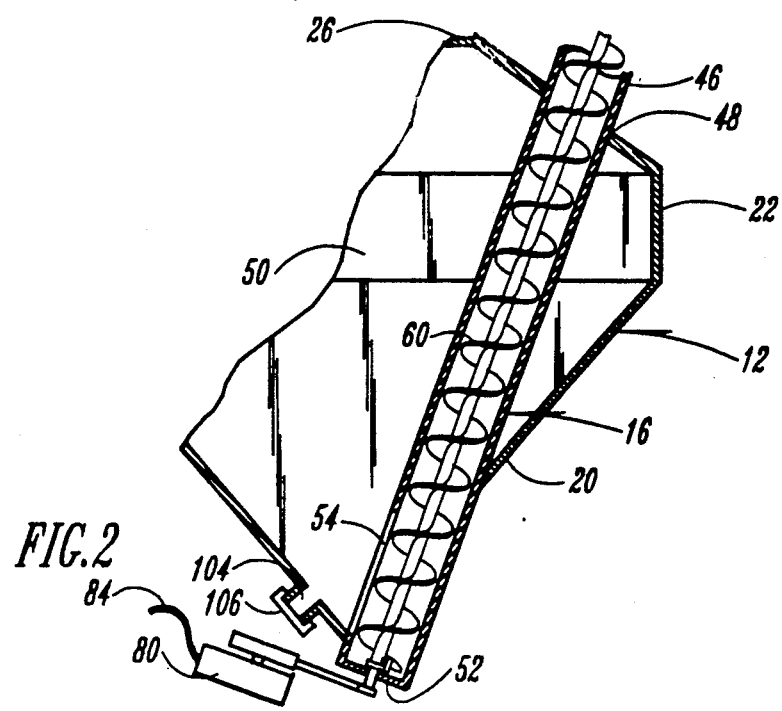
FIG. 2 is a partial sectional view of the bulk seed transport bin of the present invention.

Referring now to FIGS. 1 and 2, auger 16 includes an elongated tube 46 extending downwardly through an opening 48 in roof portion 24 of storage container 12, thence through the interior 50 of container 12, and downwardly through the lower funnel portion 20 to a lower closed end 52. Lower end 52 of tube 46 preferably extends through funnel portion 20 at the apex of the funnel portion 20, and has an intake opening 54 therein to receive the contents of container 12. Upper end 56 of auger 16 includes a removable flange 58 to permit removal of the auger flighting 60, as described in more detail herein below. An output port 62 is formed adjacent the upper end 56, to which the dispensing spout 18 is connected.

Figure 3:
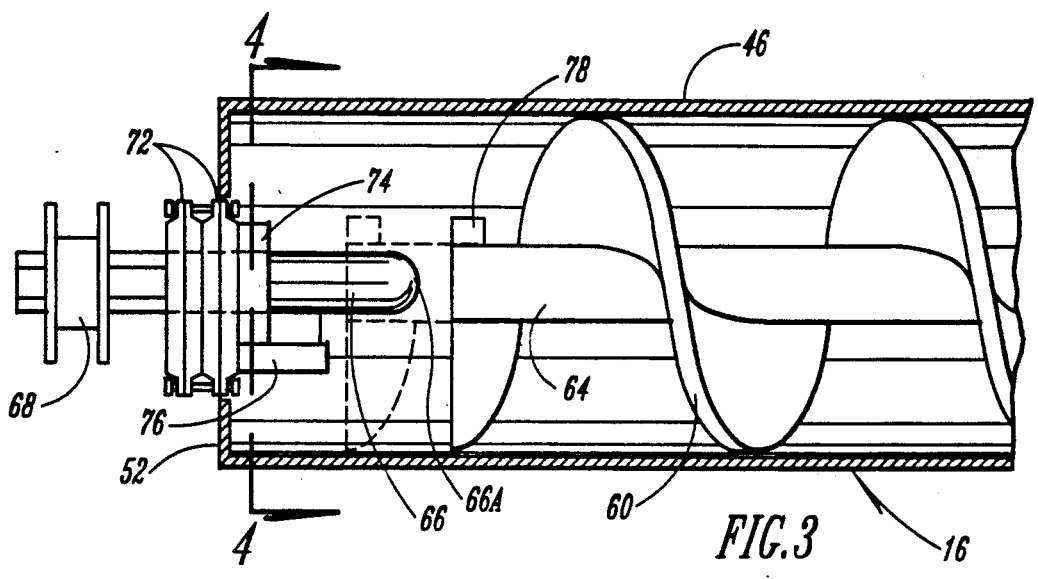
FIG. 3 is an enlargement of a portion of FIG. 2.
Figure 4:
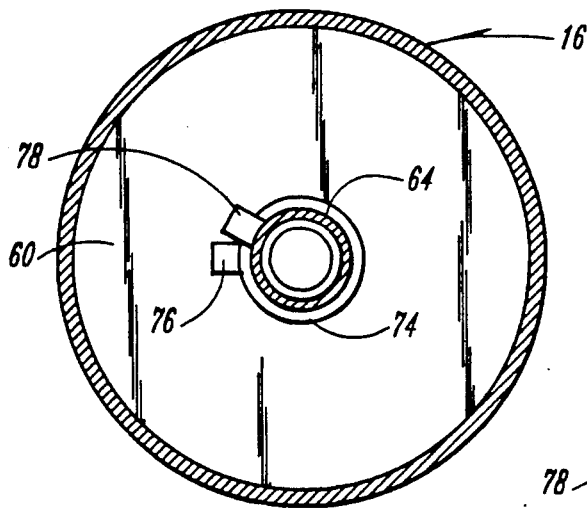
FIG. 4 is sectional view taken at lines 4—4 in FIG. 3.

Referring now to FIG. 3, the lower end of auger 16 is shown in more detail. Auger flighting 60 is mounted on a hollow pipe 64 which will receive the upper end 66a of a connector shaft 66. Connector shaft 66 interconnects auger 64 with a pulley 68 which is driven by a motor 80 (shown in FIGS. 5 and 6) A double bearing 72 is mounted in the lower end 52 of auger tube 46 to rotatably bear connector shaft 66. A collar 74 is mounted on connector shaft 66 and located within tube 46, to rotate with connector shaft 66. An arm 76 is mounted on collar 74 and projects upwardly, parallel to the longitudinal axis of connector shaft 66 and auger pipe 64. A stop 78 is affixed to the lower end of auger pipe 64 as shown in FIG. 3, such that arm 76 will contact stop 78 when auger pipe 64 is engaged on the upper end of connector shaft 66, such that connector shaft 66 will rotate auger pipe 64.

Figure 5:
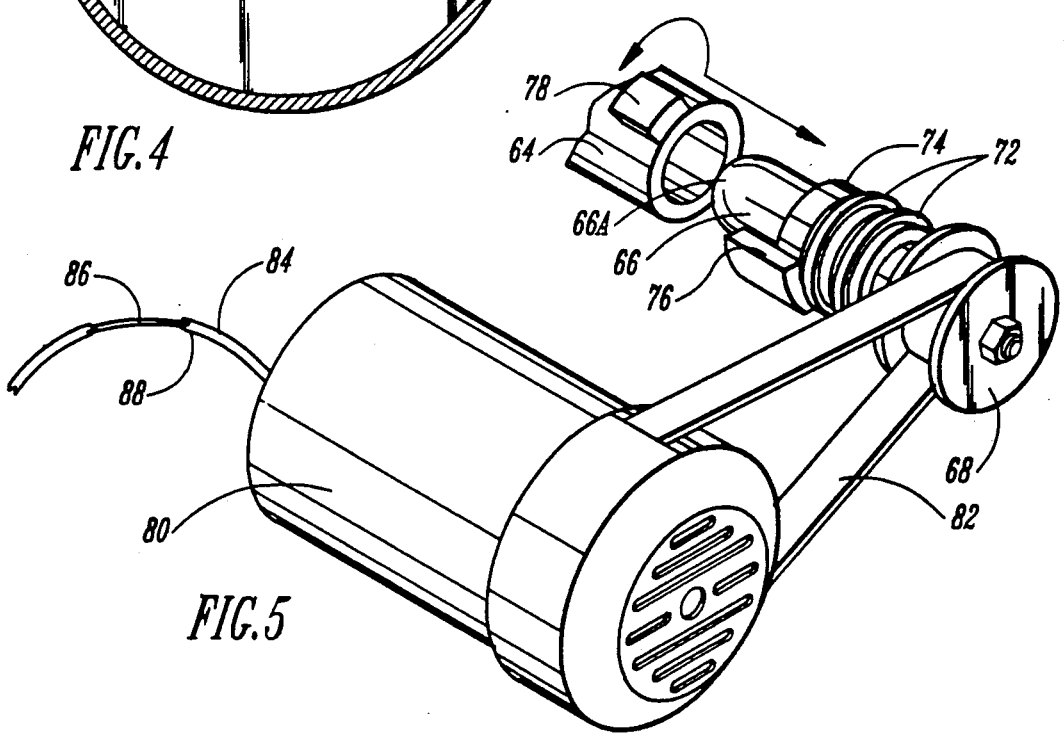
FIG. 5 is a partial perspective view of the auger motor and connecting shaft for the auger.
Figure 6:
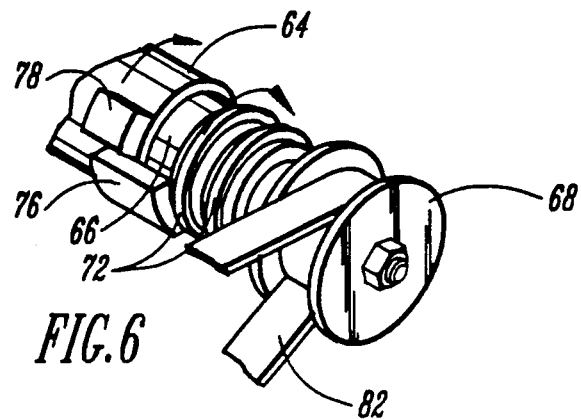
FIG. 6 is a perspective view of the connecting shaft shown in FIG. 5, connected to the auger.

FIG. 5 shows auger pipe 64 being inserted downwardly onto connector shaft 66, while FIG. 6 shows auger pipe 64 engaged on connector shaft 66. Rotation of connector shaft 66 will cause arm 76 to engage stop 78 and thereby drive auger pipe 64. Thus, auger pipe 64 and flighting 60 may be easily removed and replaced by removing end flange 58 (see FIG. 1) and withdrawing the auger pipe and flighting from the upper end 56 of auger tube 46. An auger with different flighting may then be replaced within auger tube 46 by engaging the lower end of the auger pipe 64 with the connector shaft 66 (as shown in FIG. 3) and replacing the end flange 58.

Referring now to FIG. 5, pulley 68 is mounted on the lower end of connector shaft 66 and is driven by a motor 80 via a drive belt 82. A cable 84 is operably connected to motor 80 and includes a wire 86 slidably mounted within tubular housing 88 and operably connected to a clutch on motor 80 so as to engage and disengage drive belt 82 upon movement of wire 86.

Figure 7:
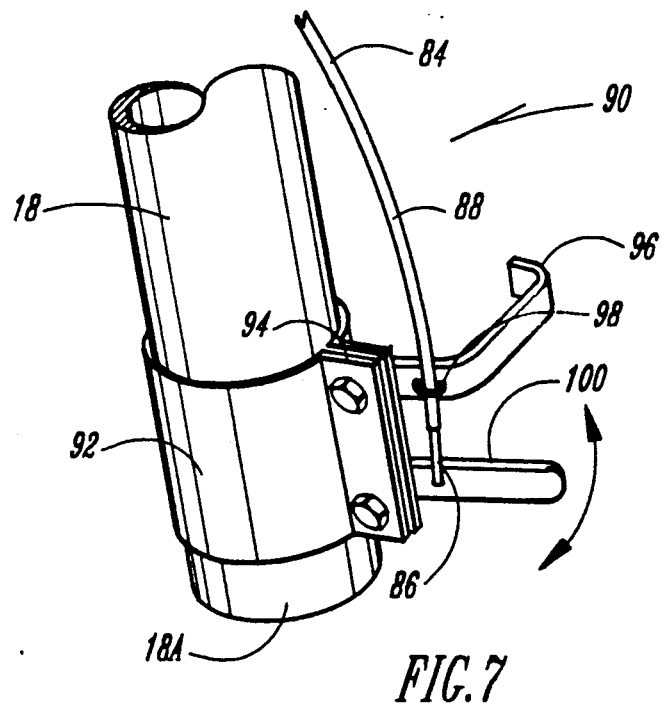
FIG. 7 is an enlarged perspective view of the end of the dispensing spout of the present invention.

Referring again to FIG. 1, cable 84 extends from motor 80 and is fastened to auger tube 46 and dispensing spout 18 with its opposite end operably connected to a control apparatus 90 mounted on the lower open end 18a of dispensing spout 18. As shown in FIG. 7, control apparatus 90 includes a collar 92 clamped to dispensing spout 18, with a pair of projecting flanges 94 bolted together to fasten collar 92 in position. A handle 96 is mounted on flanges 94 and has a clamp 98 thereon which selectively grips the tubular housing 88 of cable 84. A lever 100 is pivotally mounted to flanges 94 spaced apart from handle 96, and has wire 86 of cable 84 connected thereto. Thus, pivotal movement of lever 100 will cause wire 86 to slide within housing 88 thereby operating the clutch on motor 80 so as to selectively control the speed and engagement of the motor.

Referring again to FIG. 1, dispensing spout 18 has a flexible elbow 102 at its upper end which is connected to output port 62. Elbow 102 is preferably an accordian-like joint which permits spout 18 to be easily moved to a wide variety of positions to direct the dispensing of materials from storage container 12.

A port 104 is formed at the lower end of funnel portion 20 of storage container 12, as shown in FIG. 2, in order to permit the removal of product from storage container 12 in the event of failure of the motor 80. A cap 106 seals port 104 when the port is not in use.

Whereas the invention has been shown and described in connection with the preferred embodiment thereof, it will be understood that many modifications, substitutions and additions may be made which are within the intended broad scope of the appended claims. There has therefore been shown and described an improved bulk seed transport bin which accomplishes at least all of the above stated objects.

We claim:

1. A bulk seed transport bin, comprising:

a frame for supporting a container;

an enclosed storage container mounted on said frame and having a roof portion, a side wall portion and a generally funnel-shaped lower portion;

an access opening formed in said roof portion for loading said container with product;

a lid operably mounted on the roof portion of said container and operable between an open position revealing the access opening, and a closed position covering the access opening;

an auger mounted through the roof portion of said container for dispensing product from said container;

said auger including:

an elongated tube having upper and lower ends, the upper end projecting upwardly and outwardly through the roof portion, the lower end projecting downwardly and outwardly through the lower portion, and an intermediate portion of said tube located within the interior of said container;

an intake opening formed through the intermediate portion of said tube within said container, through which product within the container will pass into said tube;

a dispensing port formed in the upper end of said tube, above the roof portion of the container, for dispensing products from the tube; and an auger shaft having upper and lower ends, rotatably mounted within said tube such that rotation of the shaft will move product upwardly through the tube from the intake opening to the dispensing port;

a connector shaft rotatably mounted through an opening in the lower end of said auger tube, for supporting and rotating said auger shaft, said connector shaft having an upper end projecting within the auger tube, and a lower end projecting downwardly exteriorly of the auger tube;

said auger shaft having a hollow lower end removably journaled on the upper end of said connector shaft;

said auger tube having an open upper end to permit removal of said auger shaft;

a flange removably mounted on the upper end of said auger tube to selectively close the upper end, said flange rotatably bearing the upper end of said auger shaft;

coacting means on said auger shaft lower end and said connector shaft upper end, for rotating said auger shaft upon rotation of said connector shaft; and drive means connected to the lower end of the connector shaft for selectively rotating the connector shaft.

2. The transport bin of claim 1, wherein said coacting means for rotating the auger shaft includes:

an arm mounted on the upper end of said connector shaft and rotatable therewith; and a stop mounted on the lower end of said auger shaft located within the path of said arm on said connector shaft, whereby rotation of the connector shaft will cause the arm to contact the stop and rotate the auger shaft.

3. The transport bin of claim 1, further comprising a dispensing spout having upper and lower ends, the upper end thereof operably connected to the dispensing port of said auger tube, whereby the dispensing spout will direct dispensed product from said auger.

4. The transport bin of claim 3, further comprising control means operably mounted on the lower end of said dispensing spout and connected to said drive means, operable to control said drive means and thereby control the rate of dispensing of product through said auger.

5. The transport bin of claim 3, wherein the upper end of said dispensing spout includes a flexible elbow means for permitting pivotable movement of said dispensing spout lower end relative to the dispensing port of said auger.

6. The transport bin of claim 1, wherein said lid is a generally flat and planar member operably mounted for movement within a generally horizontal plane between said open and closed positions.

* * * * *